United States Patent
Dawe

Patent Number: 5,812,695
Date of Patent: Sep. 22, 1998

[54] AUTOMATIC TYPING OF RASTER IMAGES USING DENSITY SLICING

[75] Inventor: Julie Tsai-Hsin Dawe, Ft. Collins, Colo.

[73] Assignee: Hewlett-Packard Company, Palo Alto, Calif.

[21] Appl. No.: 749,041

[22] Filed: Nov. 14, 1996

Related U.S. Application Data

[63] Continuation of Ser. No. 289,718, Aug. 12, 1994, abandoned.

[51] Int. Cl.$^6$ ............................................. G06K 9/34
[52] U.S. Cl. ......................... 382/176; 382/194; 382/257; 358/462
[58] Field of Search ................................. 382/165, 176, 382/192, 194, 257, 259, 261, 196; 358/462, 469

[56] References Cited

U.S. PATENT DOCUMENTS

| | | | |
|---|---|---|---|
| 4,513,442 | 4/1985 | Scherl | 382/176 |
| 4,856,075 | 8/1989 | Smith | 382/176 |
| 4,975,972 | 12/1990 | Bose et al. | 382/257 |
| 4,996,603 | 2/1991 | Kanemitsu et al. | 358/462 |
| 5,202,933 | 4/1993 | Bloomberg | 358/462 |
| 5,278,919 | 1/1994 | Sugiura et al. | 382/176 |
| 5,317,419 | 5/1994 | Koizumi | 358/462 |
| 5,443,164 | 8/1995 | Walsh et al. | 209/580 |

Primary Examiner—Christopher S. Kelley

[57] ABSTRACT

A system for determining the type of graphical data within a scanned image. The system scans an image to obtain grayscale image data, and then performs a density slice operation on the grayscale image data, using a predetermined grayscale range, to produce binary image data. The system erodes the binary image data, and counts the number of black pixels remaining within the image data. If the count of the black pixels within the image exceeds a maximum acceptable pixel count, the area is considered to be continuous tone, such as a photograph, otherwise, the region is considered to be bi-tonal, such as line art or text. The system can also perform multiple density slices and erosions, using different grayscale ranges, OR the results, and then analyze the result of the OR operation to determine the type of image.

15 Claims, 8 Drawing Sheets

AUTOMATIC TYPING OF RASTER IMAGES USING DENSITY SLICING

CROSS REFERENCE TO RELATED APPLICATION

This is a continuation of application Ser. No. 08/289,718 filed on Aug. 12, 1994, now abandoned.

FIELD OF THE INVENTION

This invention relates to computer systems and more particularly to electronically scanned raster images within computer systems. Even more particularly, the invention relates to determining a type of image within a scanned raster image of a document.

BACKGROUND OF THE INVENTION

When a document is being scanned electronically, the brightness of each dot, or pixel within the image of the document is stored as a code that represents the tonal range of the pixel. When using a monochromatic scanner, the tonal range varies from pure black to pure white along a grayscale. The code, or grayscale level, is typically eight bits, giving a tonal range of zero to 255, where zero is typically pure black and 255 is typically pure white.

After a document is scanned, the information content must be separated from the background before the information can be processed. A part of this separation process is to determine the type of information that has been scanned in each part of the document. For monochromatic scanning, the image is usually bi-tonal or continuous tonal. For bi-tonal images, such as line art or text information, the image can be scanned using a single bit to represent each pixel. For continuous tone images, such as photographs, eight bit grayscale scanning is normally used. Therefore, it is important to distinguish the type of information within the image, so that the image can be re-scanned using the correct number of bits per pixel to achieve the greatest information content.

A prior art, and intuitive, way to approach autotyping of images has been to examine the grayscale histogram of the area being analyzed. One would intuitively expect that an image that is inherently bi-tonal would have its grayscale pixel values clustered in two places on the histogram. If a bi-tonal image was black and white, the pixel values would peak at two places: the dark end of the histogram and the light end of the histogram. An inherently continuous tone image would not have these two characteristic peaks, but would instead vary continuously and unpredictably over the histogram range.

Histograms are difficult to analyze using conventional programming techniques. Histogram analysis seems to be a vision problem, which can require fuzzy logic or other techniques for robust interpretation. Also, bi-tonal images obtain their peaks at different values, depending upon variables such as the paper type and ink used to originally reproduce the image. For example, a line art picture on newspaper will have peaks at different areas than the same line art picture on fine linen paper, and this adds to the histogram analysis problem of locating the peaks. Also, the histogram results are dependent upon the number of pixels involved, such that if a picture is composed of very few thin lines encompassing a large area on the paper, the histogram will show a dominant peak in the white portion and only a small peak in the dark portion. In this type of image, the dark peak could easily get lost in the analysis of the data.

Another problem with histogram analysis is gray noise. If a picture is composed of only black ink on a background paper, a scanner will also pick up transition pixels of gray along the edges between the white and black portions. Therefore, the histogram will contain grayscale data even when there is no gray in the actual picture. If you consider the problem of transitional gray pixels on line art scans along with the problem of high contrast continuous tone pictures, the histograms can sometimes be very difficult to distinguish.

There is need in the art then for a method of distinguishing line art from continuous tone sections of a scanned document. The present invention meets these and other needs in the art.

SUMMARY OF THE INVENTION

It is an aspect of the present invention to determine a type of image within a scanned raster image of a document.

It is another aspect of the invention to determine whether the image is bi-tonal or continuous tone.

Another aspect is to determine the bit depth for re-scanning the image.

Still another aspect of the invention is to use density slicing and erosion methods to determine the type of image.

The above and other aspects of the invention are accomplished in a system which performs an initial scan of an image in eight bit grayscale mode, typically at a low resolution, and then analyzes the eight bit grayscale data to determine whether the final scan of an image, typically at a higher resolution, should be performed in eight bit mode or one bit mode. The system performs a density slice on the grayscale image using a predetermined grayscale range, to produce a binary image. Optionally, an erosion operation can be performed on the binary image to remove the smaller black areas of the image. The system counts the number of black pixels within the area of the document being analyzed, and then determines a maximum acceptable pixel count for the area, as determined by a function of the area being analyzed. If the count of the black pixels within the area exceeds the maximum acceptable pixel count, the area is considered to be a continuous tone area, which requires a grayscale scan using a bit depth suitable for continuous tone. Otherwise, the region is considered to be line art, which requires a binary scan having a bit depth of one.

More robust results can be obtained by performing multiple density slices and erosions, using different grayscale ranges. The results of these multiple slices are multiple binary images which are added to each other using a bitwise OR operation to form a single binary image. The pixels within the single binary image are then counted to determine the type of information within the area being considered.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
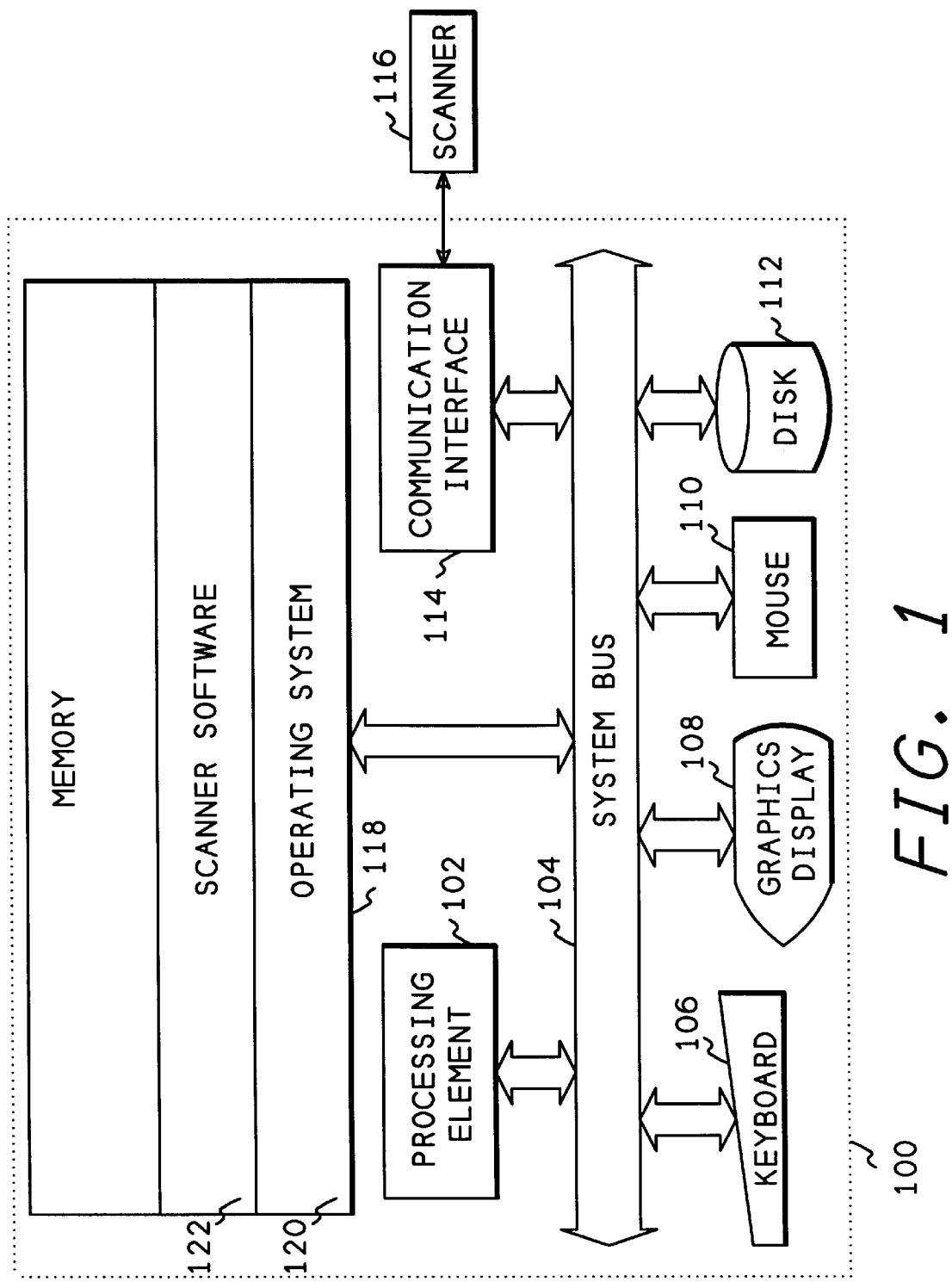
FIG. 1 shows a block diagram of a computer system containing the present invention.

FIG. 1 shows a block diagram of the hardware and software of the invention. Referring now to FIG. 1, a computer system 100 contains a processing element 102 which communicates to other elements of the computer system 100 over a system bus 104. A keyboard 106 allows user of the system 100 to input commands and data into the computer system 100. A mouse 110 allows the user to input graphical information into the computer system 100. A display 108 allows the computer system 100 to output information to the user of the system. A disk 112 stores the software of the present invention as well as all the data collected by the present invention. A communications interface 114 connects the computer system 100 to a document scanner 116 to allow the present invention to receive information from the scanner 116 and to send commands to the scanner to set the bit depth for scanning.

The document scanner 116 may be either a gray scale scanner or a color scanner. A gray scale scanner returns a gray scale value for each pixel scanned. This value is typically eight bits having a range of 0 to 255, with 0 typically being pure black and 255 typically being pure white, although other scanners may use a different number of bits for each pixel. Color scanners return three values, red, green, and blue, for each pixel, and each value has a range of 0 to 255.

A memory 118 contains an operating system 120 which is used by the present invention to access the keyboard, graphics display 108, mouse 110, disk 112, as well as other elements of the computer system 100. The scanner software 122 contains the present invention.

Figure 2:
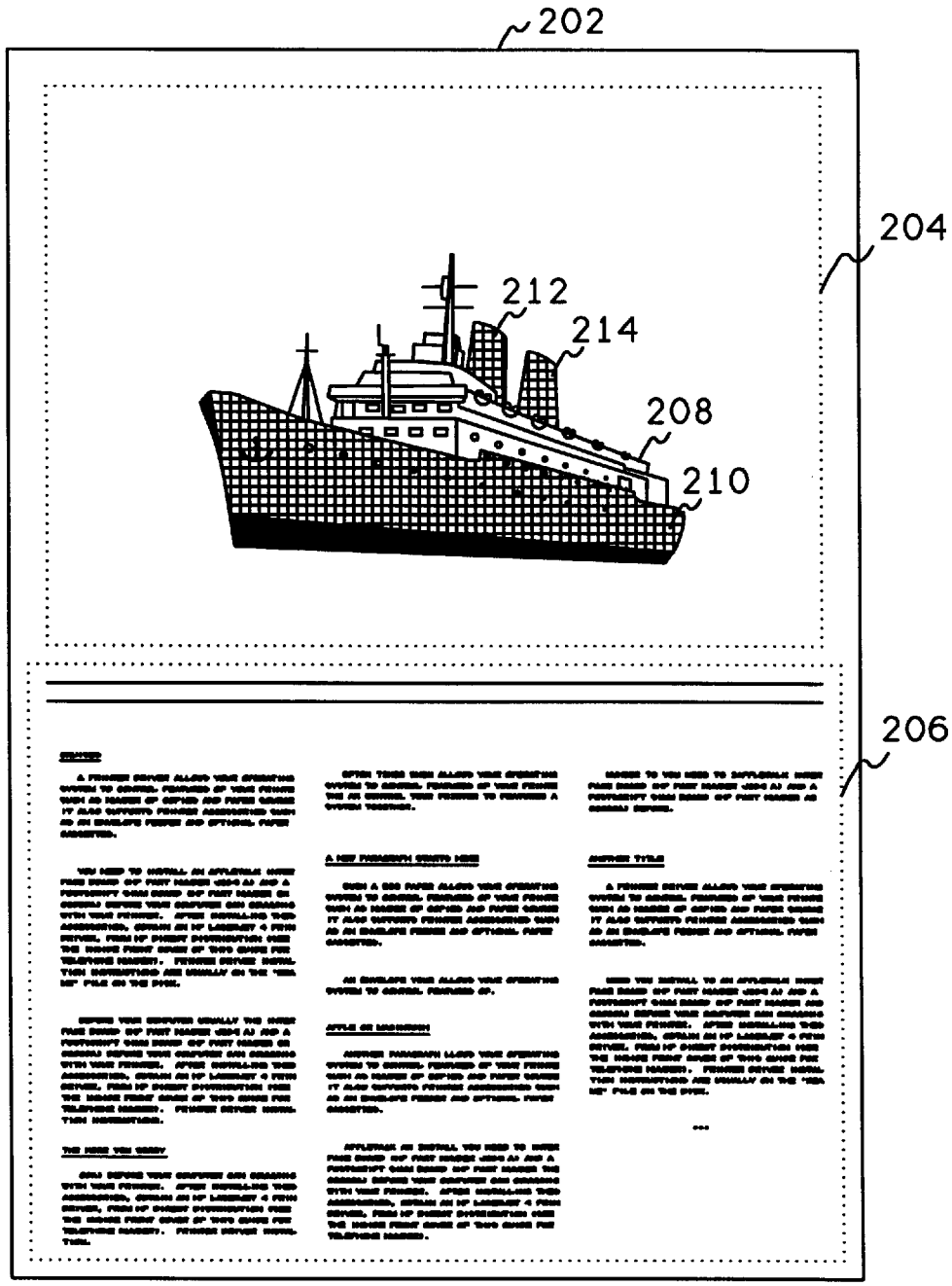
FIG. 2 shows an example image being processed by the present invention.

FIG. 2 shows an example of an image being processed by the present invention. Referring now to FIG. 2, an image is contained within an area 202, which is typically a sheet of paper that is electronically scanned by a scanner device. Within the scanned image 202 are two sections, comprising the top half 204 which contains a continuous tone image that has some line art 208 but also has continuous tonal areas 210, 212, and 214. The bottom half of the image 202 contains only textual information 206, which can be treated as line art.

The purpose of the present invention is to identify whether a section of a document, for example section 204 or section 206, contains a continuous tone image or a bi-tonal image. The section of the document to be analyzed will have been previously selected by other software, and the graphical image of the section to be analyzed passed to the method of the present invention.

Figure 3:
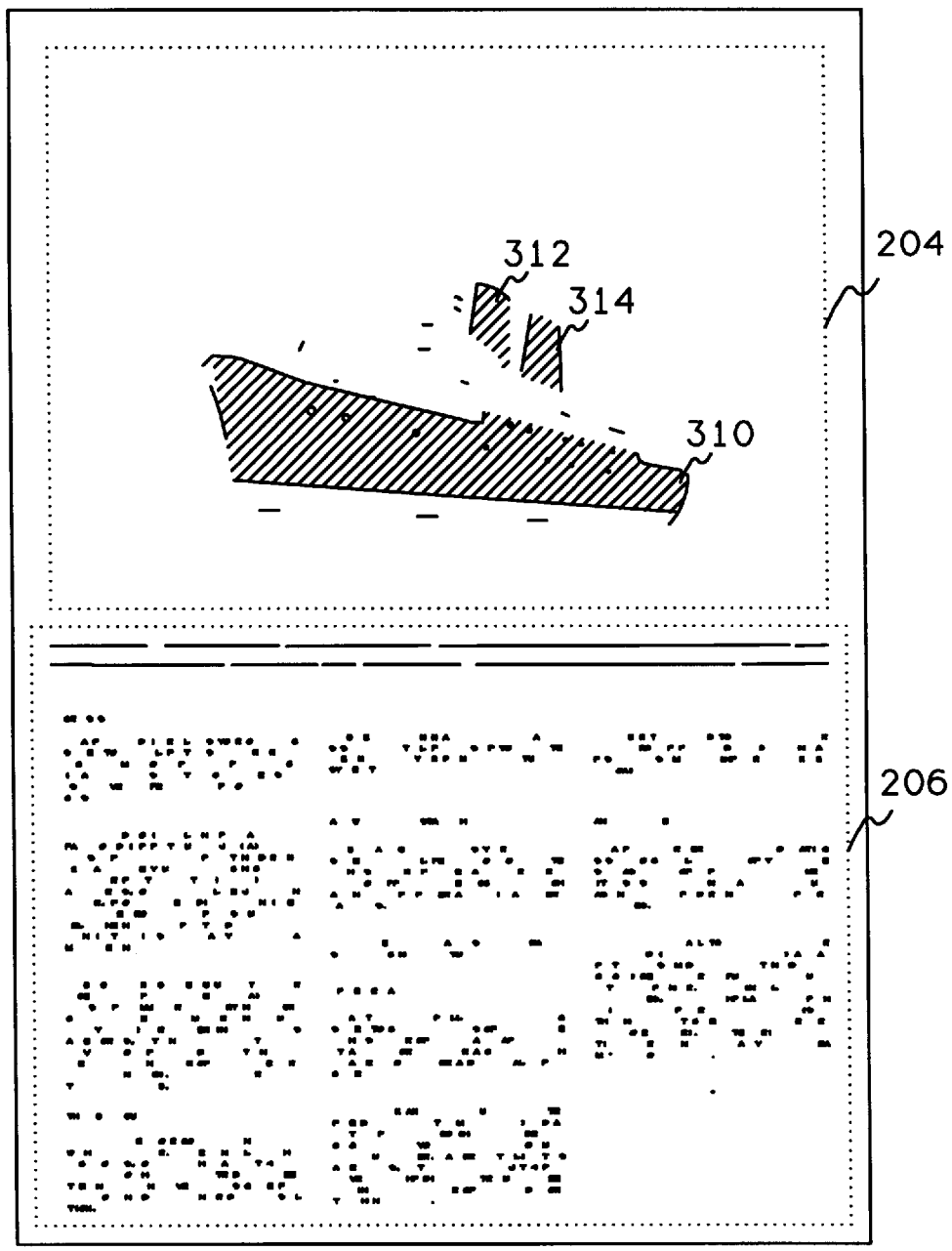
FIG. 3 shows the image of FIG. 2 after the invention has performed a density slicing operation on the image.

The present invention first performs a density slice operation on the graphical image to be analyzed to produce a binary image. FIG. 3 shows an example binary image that results from performing a density slice operation on the image of FIG. 2. Referring now to FIG. 3, the bottom half of the binary image of FIG. 3, area 206 from FIG. 2, shows a large number of small dark areas which resulted from the density slice operation on the text area of 206 of FIG. 2. The top half of FIG. 3, which contains the continuous tone image within the area 204, has also been transformed using a density slice operation. The result is that the line art areas 208 in FIG. 2 have nearly all been removed, however, the continuous tone areas 210, 212, and 214 of FIG. 2 have been converted into solid black areas 310, 312, and 314 within FIG. 3. Thus, the result of the density slice operation is a binary image containing only black and white pixels.

Figure 4:
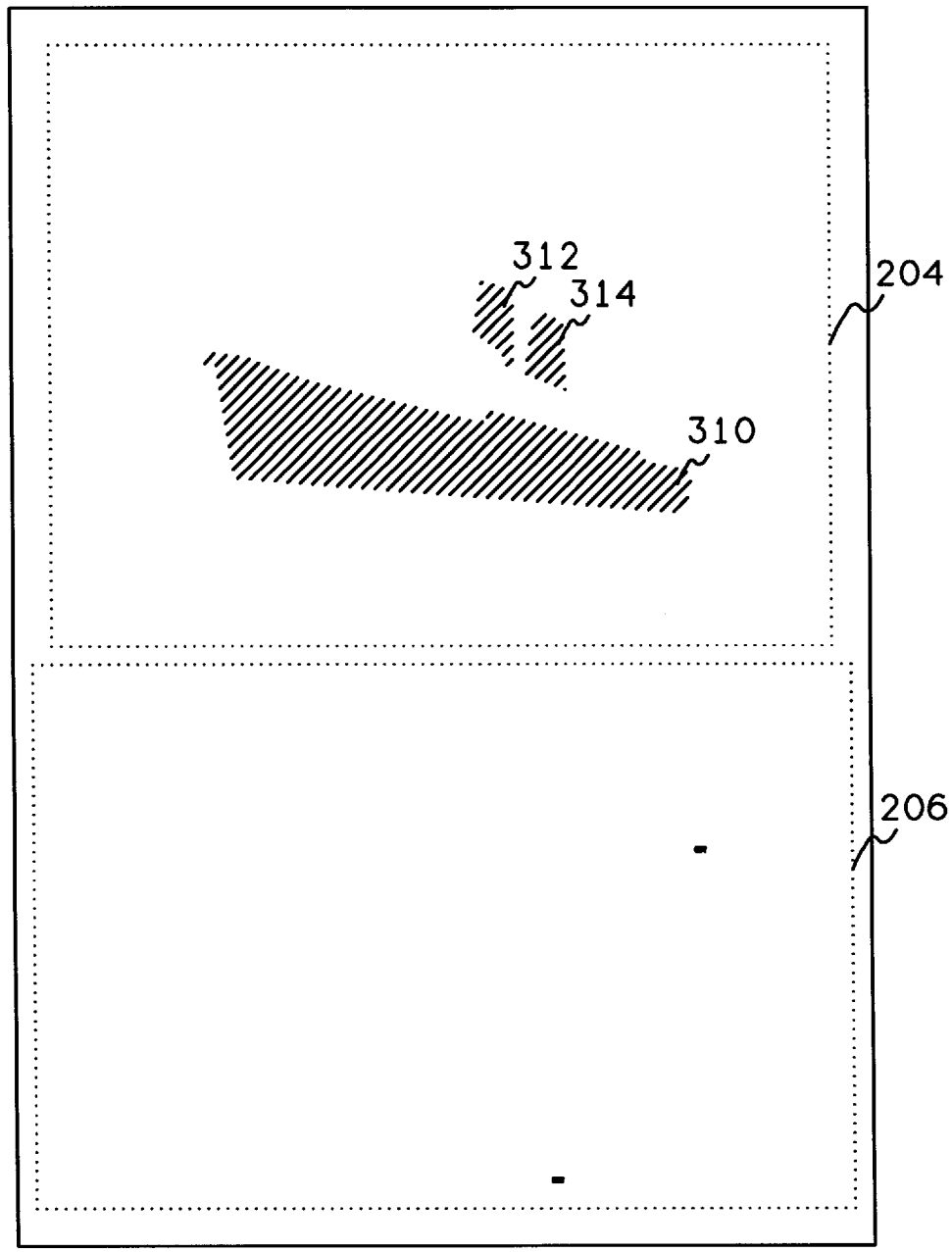
FIG. 4 shows the image of FIG. 3 after the invention has performed an erosion operation on the image.

FIG. 4 shows the image of FIG. 3 after the invention has performed an erosion operation on the image of FIG. 3. Referring now to FIG. 4, the erosion operation has nearly eliminated all the black pixels from the area 206 which originally contained text information. Thus, a very low count of black pixels would indicate that the area contains line art or textual information. Conversely, the areas 310, 312, and 314 within the area 204 still contain a large number of black pixels after the erosion operation has been performed. This large count of black pixels indicates that the area contains a continuous tonal picture, and would require that it be re-scanned using a bit depth suitable for grayscale.

Figure 5:
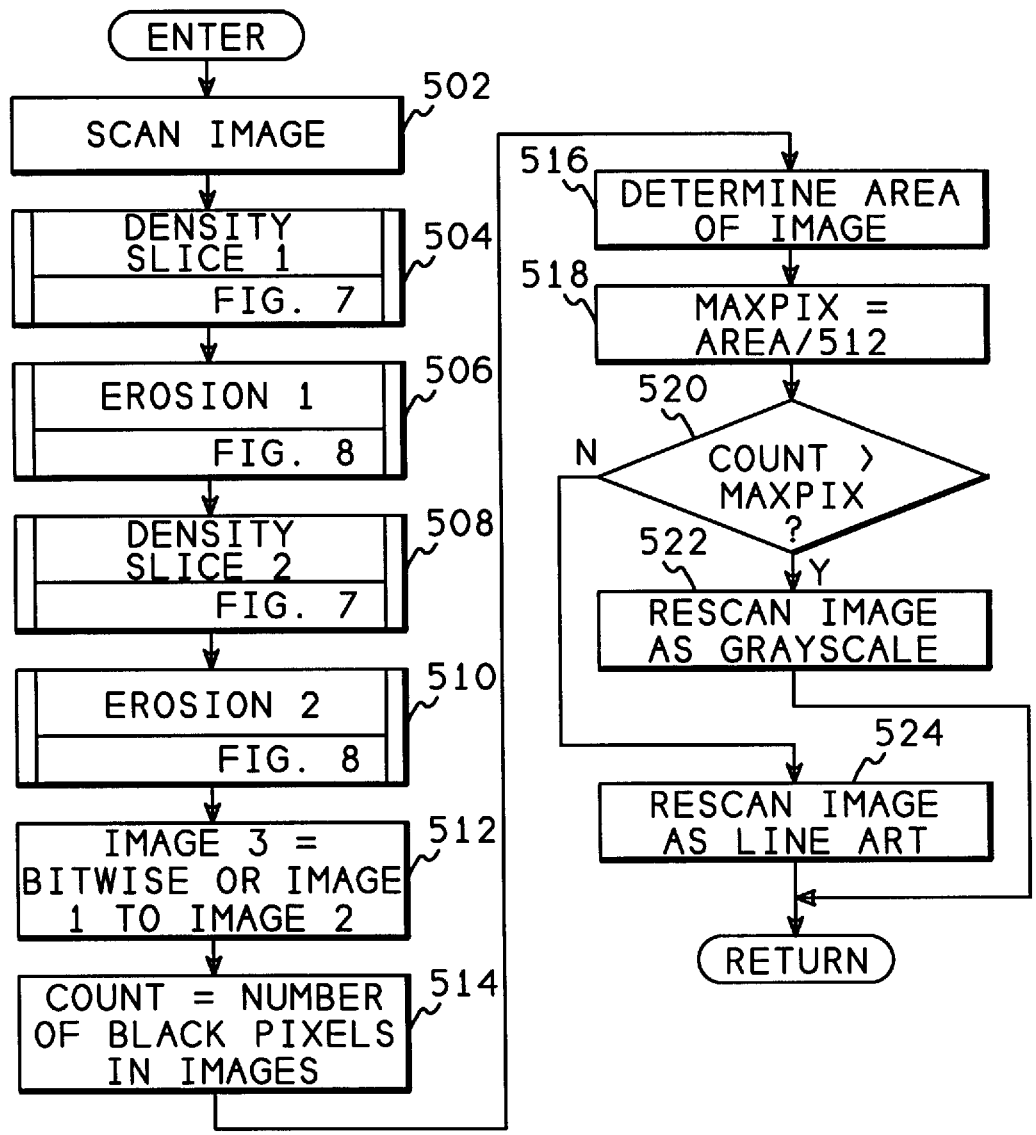
FIG. 5 shows a flowchart of the invention.

FIG. 5 shows a flowchart of the present invention. The software of FIG. 5 is contained within the scanner software 122 (FIG. 1) and would be called after the user has requested that a document be scanned and typed. Referring now to FIG. 5, after entry, block 502 sends commands over the communications interface 114 (FIG. 1) to the scanner 116 (FIG. 1) to scan the image using eight bit grayscale format. This is typically done at a low resolution, for example as low as 25 pixels per inch. Performing the original scan and analysis at low resolution saves processing time and memory, however, the invention will perform correctly at any resolution, thus the invention is resolution independent.

The process of scanning the image might also separate multiple areas within the image to be analyzed, such as, for example, the areas 204 and 206 shown previously in FIG. 2. This would allow the invention to analyze part of the scanned image, rather than analyzing the entire image. This separation of areas is not necessary to the present invention, however, since the present invention will analyze any area passed to it.

Figure 7:
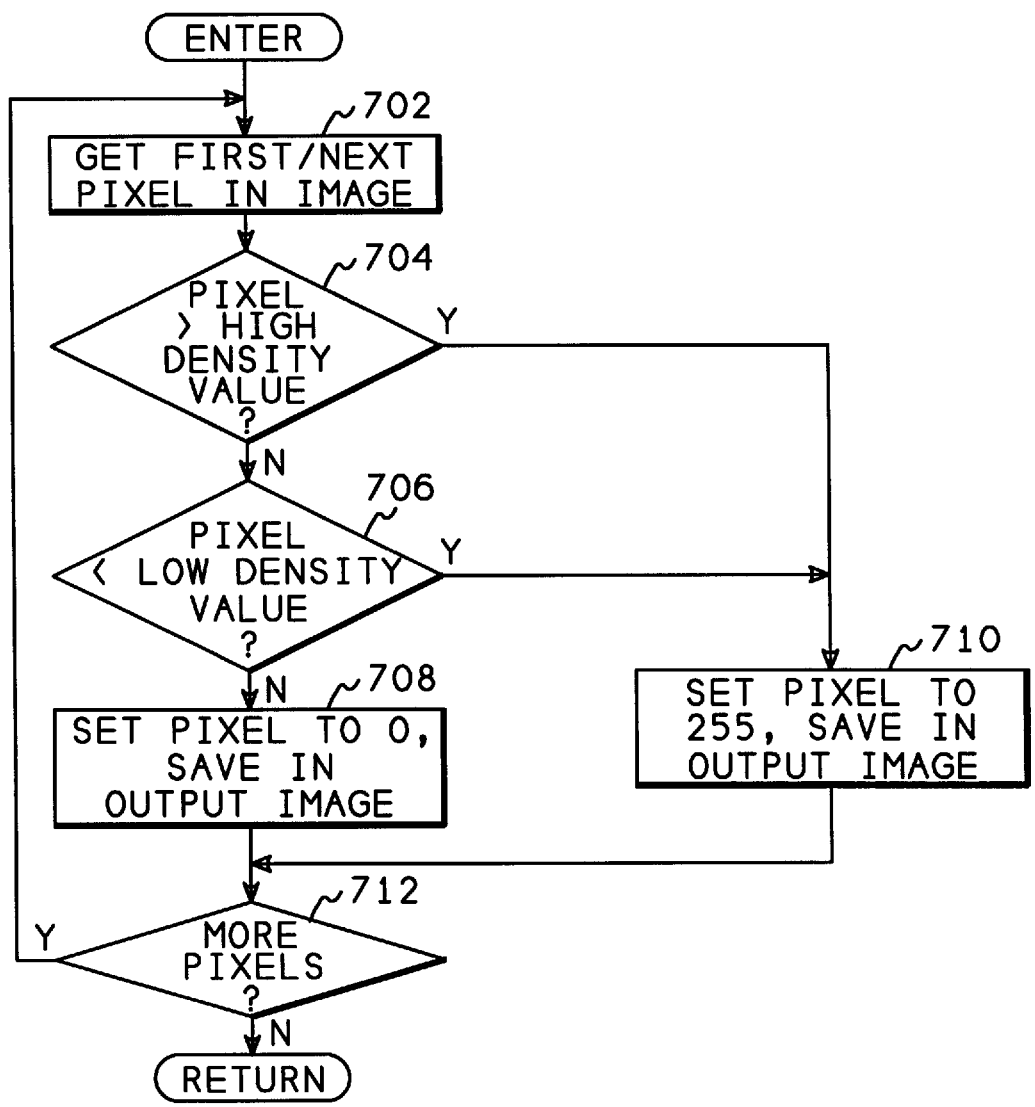
FIG. 7 shows a flowchart of the density slicing process.

After obtaining the scanned image, block 504 calls FIG. 7 to perform a density slice operation on the image using a first tonal range. For example, this density slice might separate pixels having a tonal value ranging between 62 and 147 on a scale of 0 to 255. The result of the density slice operation is a binary image wherein the pixels with values inside the tonal range are converted to black and the pixels outside the tonal range are converted to white.

The tonal range to be used for a particular density slice is determined by the type of document that is being scanned. Typically, the tonal range that represents a medium gray tone would be used for the density slice.

Figure 8:
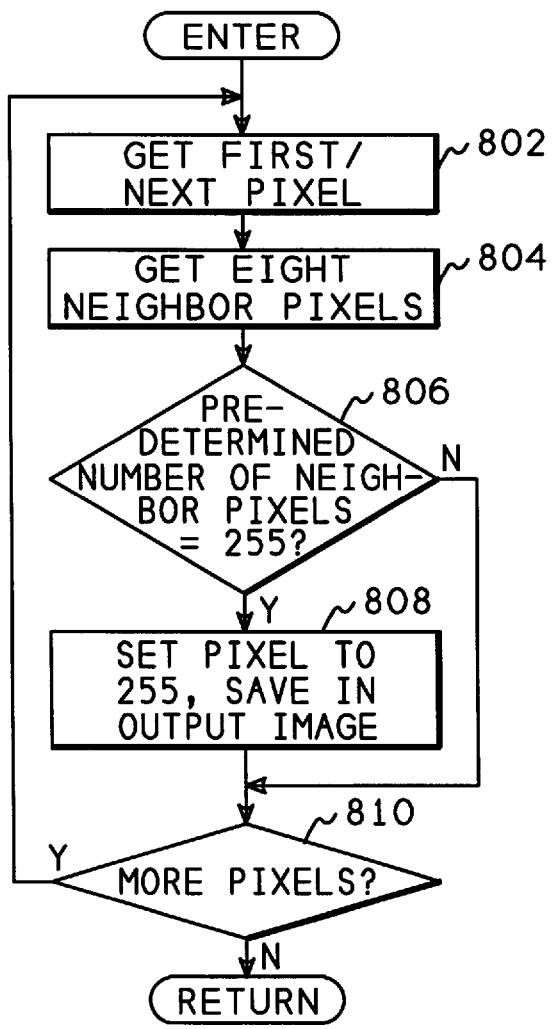
FIG. 8 shows a flowchart of the erosion process.

After performing the density slice, block 506 calls FIG. 8 to perform an erosion operation on the binary image that resulted from the density slice operation. The erosion operation is not necessary to the invention, however, it may improve results by eliminating small areas of black (e.g. specks), while leaving the large areas of black.

Block 508 then calls FIG. 7 again passing the originally scanned image to FIG. 7 to perform a second density slice using a different tonal range, for example, between tonal values 39 and 123 on a scale of 0 to 255. When performing two density slice operations, typically the invention uses a light gray to medium gray tonal range for the first density slice, and a medium gray to dark gray tonal range for the second density slice.

After the density slice is performed, block 510 calls FIG. 8 to perform an erosion operation on the binary image that resulted from the operation of block 508 and then block 512 forms a third binary image by using a bitwise OR operation between image 1, formed by the first erosion operation of block 506, and image 2, formed by the second erosion of block 510. Block 514 then counts the number of black pixels contained in image 3 that resulted from the operation of block 512.

Block 516 determines the area (i.e. number of pixels) of the image that is being analyzed, and block 518 creates a maximum pixel value MAXPIX by dividing the area determined in block 516 by a value of 512. MAXPIX represents the maximum number of pixels that an area can have and still be considered line art. Other methods could also be used to determine the value for MAXPIX, such as, for example, analyzing various scanned documents and arbitrarily selecting a value of MAXPIX that results in a correct determination of the line art and continuous tonal areas of the documents analyzed.

After determining MAXPIX, block 520 determines whether the count determined in block 514 is greater than MAXPIX, and if it is, transfers to block 522 which sends command signals to the scanner 116 to re-scan the image as a grayscale image, using a bit density suitable for grayscale such as eight bits per pixel, since the image must be a continuous tone image. Also, the re-scan may be performed at a different resolution from the original scan, for example 100 pixels per inch. If the original scan of the image was at the bit density and resolution suitable for the continuous tone image, step 522 could be skipped, thus the image would not be re-scanned.

If the count is not greater than MAXPIX, block 520 transfers to block 524 which sends signals to the scanner 116 to re-scan the image using one bit binary bit density, since the image is a line art image. Also, the re-scan may be performed at a different resolution from the original scan, for example 300 pixels per inch. After re-scanning the image, FIG. 5 returns to the scanner software section from which it had been called.

Figure 6:
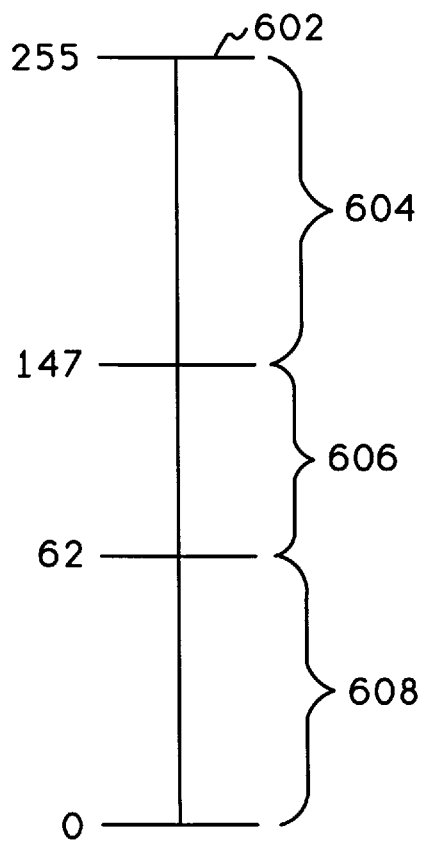
FIG. 6 shows a diagram illustrating the process of density slicing.

FIG. 6 shows a diagram illustrating the process of density slicing. Referring now to FIG. 6, a grayscale 602 is shown which represents the numerical values that result from an eight bit grayscale scan of pixels. On the grayscale 602, the value 0 represents pure black and the value 255 represents pure white. Along the grayscale 602, three tonal ranges have been illustrated. Tonal range 604 represents the predominantly white or very light areas of pixels, above the value 147. Area 606 represents mid tone areas between the values of 62 and 147 and area 608 illustrates predominantly dark areas between the values of 0 and 62. The numbers 62 and 147 are arbitrary, however, since many other tonal ranges could be used.

Density slicing involves analyzing each pixel within an area, and determining which of the three tonal ranges 604, 606, or 608 contains the pixel value. If the pixel value lies either within area 604 or area 608, it is converted to a white pixel having a value of 255. If the pixel value lies within the tonal range 606, it is converted to a black pixel having a value of zero. The result of this operation is that all pixels which were originally black or originally white are converted to a white value in the resulting binary image, and all pixels which were originally a mid tone value are converted to black in the resulting binary image.

FIG. 7 shows a flowchart of the density slicing process called from FIG. 5. Referring now to FIG. 7, after entry, block 702 gets the first or next pixel from the image being analyzed. Block 704 determines whether the pixel is greater than the high density slice value within the density slice range, and if so, block 704 transfers to block 710 which sets the pixel to a white value of 255 and then saves the pixel in the output binary image.

If the pixel is not greater than the high density value, block 704 transfers to block 706 which determines whether the pixel value is less than the low density slice value. If the pixel is less than the low density slice value, block 706 transfers to block 710 which sets the pixel to the white value of 255 and then saves the pixel in the output binary image.

If the pixel is not less than the low density value, block 706 transfers to block 708 since the pixel has a mid tone value. Block 708 sets the pixel to a black value of 0, and then saves the pixel value in the output binary image.

After the pixel has been converted to either black or white, control goes to block 712 which determines whether there are more pixels to be processed and if there are, block 712 returns to block 702 to process the next pixel. After all pixels have been processed, FIG. 7 returns to FIG. 5.

The erosion process removes pixels from the edges of objects in binary images, where continuous black areas in the image are considered objects, and the background is assumed to be white. A pixel is removed from the binary image, by setting it to a value of white, if more than a predetermined number of its eight neighbors have a white value. That is, for each pixel, there are eight neighbors, two on either side, one above, one below, and four on each corner of the pixel. The erosion process analyzes these eight neighbors, and if a predetermined number of them are white, the pixel itself is set to white. In the present invention, this predetermined number is four. That is, if at least four of the neighbors of the pixel are white, the pixel itself is converted to white. The process of erosion separates objects that are touching and removes isolated pixels from consideration.

Other methods of erosion could also be used to remove the small black areas in the image, to accomplish the same purpose—that of finding the number of pixels that were originally located in large gray tone areas. Also, as discussed above, the erosion operation need not be performed.

FIG. 8 shows a flowchart of the erosion process of the present invention. Referring now to FIG. 8, after entry, block 802 gets the first or next pixel from the binary image. Block 804 then obtains the eight neighbor pixels, and block 806 determines whether the predetermined number of neighbor pixels, that is four, have the value of 255. If at least four neighbor pixels have a value of 255, block 806 transfers to block 808 which sets the pixel value to 255 in the binary image, thus removing this pixel. If less than four neighbor pixels contain 255, block 806 transfers directly to block 810 which determines whether there are more pixels to be analyzed. If there are more pixels to be analyzed, block 810 transfers back to block 802 to get the next pixel. After all pixels have been analyzed in this erosion process, FIG. 8 returns to FIG. 5.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A method for identifying a type of image contained within scanned image data, wherein said scanned image data has a tonal value for each pixel within said scanned image data, said method comprising the steps of:
  (a) density slicing each pixel of said scanned image data to produce binary image data having first and second values, comprising the steps of
    (a1) density slicing each pixel of said scanned image data using a first predetermined range of density slice values to produce a first set of corresponding binary image values,
    (a2) density slicing each pixel of said scanned image data using a second predetermined range of density slice values to produce a second set of corresponding binary image values, and
    (a3) combining said first set of corresponding binary image values with said second set of corresponding binary image values to produce binary image data having said first value or said second value for each pixel;
  (b) eroding said binary image data without dilating said binary image data;
  (c) counting a number of first values in said binary image data;
  (d) when said number of first values counted in step (b) is greater than a predetermined number, identifying said image as a continuous tonal type of image; and
  (e) when said number of first values counted in step (b) is less than or equal to said predetermined number, identifying said image as a bi-tonal type of image.

2. The method of claim 1 wherein step (b) further comprises the steps of;
  (b1) for each pixel value within said scanned image data, locating each neighbor pixel value; and
  (b2) when a predetermined number of neighbor pixel values are equal to said second value, setting said pixel value to said second value.

3. The method of claim 2 wherein said predetermined number of neighbor pixel values is four.

4. The method of claim 1 wherein step (a) further comprises the steps of:
  (a1) comparing each pixel value within said scanned image data to a predetermined range of values;
  (a2) when a pixel value is within said range of predetermined values, setting said pixel value to said first value; and
  (a3) if a pixel is outside said range of predetermined values, setting said pixel value to said second value.

5. The method of claim 1 wherein said combining of step (a3) comprises a bitwise OR operation.

6. A method for determining a type of image contained on a document, said method comprising the steps of:
  (a) sending a signal to a scanner device to scan said document to obtain scanned image data having a tonal value for each pixel scanned;
  (b) density slicing each pixel of said scanned image data to produce binary image data having first and second values, comprising the steps of
    (b1) density slicing each pixel of said scanned image data using a first predetermined range of density slice values to produce a first set of corresponding binary image values,
    (b2) density slicing each pixel of said scanned image data using a second predetermined range of density slice values to produce a second set of corresponding binary image values, and
    (b3) combining said first set of corresponding binary image values with said second set of corresponding binary image values to produce binary image data having said first value or said second value for each pixel;
  (c) eroding said binary image data without dilating said binary image data;
  (d) counting a number of first values in said binary image data;
  (e) when said number of first values counted in step (c) is greater than a predetermined number, retaining said scanned image data obtained in step (a), wherein said image contained on said document is a continuous tonal image; and
  (f) when said number of first values counted in step (c) is less than or equal to said predetermined number, sending a signal to said scanner device to re-scan said document to obtain image data having binary values, wherein said image contained on said document is a bi-tonal image.

7. The method of claim 6 wherein step (c) further comprises the steps of;
  (c1) for each pixel value within said scanned image data, locating each neighbor pixel value; and
  (c2) when a predetermined number of neighbor pixel values are equal to said second value, setting said pixel value to said second value.

8. The method of claim 7 wherein said predetermined number of neighbor pixel values is four.

9. The method of claim 6 wherein step (b) further comprises the steps of:
  (b1) comparing each pixel value within said scanned image data to a predetermined range of values;
  (b2) when a pixel value is within said range of predetermined values, setting said pixel value to said first value; and
  (b3) if a pixel is outside said range of predetermined values, setting said pixel value to said second value.

10. The method of claim 6 wherein said combining of step (b3) comprises a bitwise OR operation.

11. A method for determining a type of image contained on a document, said method comprising the steps of:
  (a) sending a signal to a scanner device to scan said document at a first predetermined resolution to obtain scanned image data having a tonal value for each pixel scanned;
  (b) density slicing each pixel of said scanned image data to produce binary image data having black and white values comprising the steps of
    (b1) density slicing each pixel of said scanned image data using a first predetermined range of density slice values to produce a first set of corresponding binary image values,
    (b2) density slicing each pixel of said scanned image data using a second predetermined range of density slice values to produce a second set of corresponding binary image values, and
    (b3) combining said first set of corresponding binary image values with said second set of corresponding binary image values to produce binary image data having said black value or said white value for each pixel;

(c) eroding said binary image data without dilating said binary image data;

(d) counting a number of black values in said binary image data;

(e) when said number of black values counted in step (c) is greater than a predetermined number, sending a signal to said scanner device to re-scan said document at a second predetermined resolution to obtain image data having a tonal value for each pixel scanned, wherein said image contained on said document is a continuous tone image; and (f) when said number of black values counted in step (c) is less than or equal to said predetermined number, sending a signal to said scanner device to re-scan said document at a third predetermined resolution to obtain image data having binary values, wherein said image contained on said document is a bi-tonal image.

12. The method of claim 11 wherein step (c) further comprises the steps of;

(c1) for each pixel value within said scanned image data, locating each neighbor pixel value; and (c2) when a predetermined number of neighbor pixel values are equal to said second value, setting said pixel value to said second value.

13. The method of claim 7 wherein said predetermined number of neighbor pixel values is four.

14. The method of claim 11 wherein step (b) further comprises the steps of:

(b1) comparing each pixel value within said scanned image data to a predetermined range of values;

(b2) when a pixel value is within said range of predetermined values, setting said pixel value to said black value; and (b3) if a pixel is outside said range of predetermined values, setting said pixel value to said white value.

15. The method of claim 11 wherein said combining of step (b3) comprises a bitwise OR operation.

* * * * *